United States Patent [19]

Terashima

[11] Patent Number: 5,178,236
[45] Date of Patent: Jan. 12, 1993

[54] REACTION FORCE TYPE DISK BRAKE
[75] Inventor: Hideyuki Terashima, Nagano, Japan
[73] Assignee: Nissen Kogyo Kabushiki Kaisha, Nagano, Japan
[21] Appl. No.: 691,897
[22] Filed: Apr. 26, 1991
[30] Foreign Application Priority Data
  Apr. 28, 1990 [JP] Japan ................ 2-46548[U]
[51] Int. Cl.⁵ ............................................. F16D 65/14
[52] U.S. Cl. ................................ 188/73.45; 188/73.31
[58] Field of Search ............... 188/71.1, 71.3, 72.1, 188/72.4, 72.5, 73.1, 73.31, 73.32, 73.39, 73.45, 264 A, 264 AA, 205 R, 206 R, 73.38

[56] References Cited
U.S. PATENT DOCUMENTS

| 3,051,272 | 8/1962 | Burnett | 188/206 R |
| 3,980,160 | 9/1976 | Hoffmann et al. | 188/73.38 |
| 4,072,216 | 2/1978 | Haraikawa | 188/73.45 X |
| 4,476,962 | 10/1984 | Bofill | 188/71.1 |
| 4,530,423 | 7/1985 | Ritsema | 188/73.39 |
| 4,609,079 | 9/1986 | Méry | 188/73.45 |
| 4,658,938 | 4/1987 | Thiel et al. | 188/73.38 |
| 4,669,583 | 6/1987 | Mery | 188/73.38 |
| 4,732,242 | 3/1988 | Heibel | 188/73.45 |
| 4,784,243 | 11/1988 | Méry | 188/73.45 |

FOREIGN PATENT DOCUMENTS

| 1183807 | 12/1964 | German Democratic Rep. | 188/73.38 |
| 3612355 | 10/1987 | German Democratic Rep. | 118/73.38 |
| 56-76733 | 6/1981 | Japan . | |
| 8083389 | 5/1989 | Japan . | |
| 1349455 | 4/1974 | United Kingdom | 188/73.38 |

Primary Examiner—Robert J. Oberleitner
Assistant Examiner—Peter M. Poon
Attorney, Agent, or Firm—Armstrong, Westerman, Hattori, McLeland & Naughton

[57] ABSTRACT

A reaction force type disk brake includes a brake caliper having first and second clamping arms for clamping therebetween first and second friction pads opposed to opposite sides of a brake disk, and a pair of bridge portions inter-connecting the clamping arms, a window being defined by the clamping arms and the bridge portions. An urging member is provided in the first clamping arm for urging the first friction pad against the brake disk. The friction pads are slidably suspended within the window by a pair of support portions of a stationary bracket. A pair of slide pins are provided in a projecting manner on the support portions and slidably fitted in pin holes made at portions of the first clamping arm connected with the bridge portions. A pair of bag-like raised portions, each having the pin hole therein, are raised on an outer periphery of the first clamping arm in a radial direction of the brake disk and each have one end projecting from an inner surface of the first clamping arm and connected to corresponding one of the bridge portions.

7 Claims, 4 Drawing Sheets

REACTION FORCE TYPE DISK BRAKE

BACKGROUND OF THE INVENTION

1. Field of the Invention

The field of the present invention is reaction force type disk brakes primarily used in a vehicle, and more particularly, improvements in reaction force type disk brakes of a type including a brake disk; a first and a second friction pad which are opposed to opposite sides of the brake disk; a brake caliper having a first and a second clamping arm for clamping the friction pads therebetween, and a pair of bridge portions inter-connecting opposite ends of the respective clamping arms which are spaced from each other in a circumferential direction of the brake disk, the caliper having a window defined by the clamping arms and the bridge portions; an urging member mounted in the first clamping arm for urging the first friction pad against the brake disk; a stationary bracket disposed within the window in the vicinity of the bridge portions and having a pair of support portions on which the friction pads are slidably suspended; and a pair of slide pins provided on the support portions to extended parallel to an axis of rotation of the brake disk and slidably fitted in pin holes made at portions of the first clamping arm connected with the bridge portions.

2. Description of the Prior Art

The present applicant has previously proposed such a reaction force type disk brake, for example, in Japanese Utility Model Application Laid-open No. 80833/89.

In this reaction force type disk brake, each pin hole is formed so as to pass through the first clamping arm.

With such a construction, however, the connection of the first clamping arm with the bridge portion is reduced in rigidity. This causes a problem that the first clamping arm tends to be opened away from the brake disk, that is, the lower part of the first arm, and in many cases along with the lower part of the second arm, tends to be separated from the disk. As a result, the friction pads may unevenly wear through braking operations.

In order to solve the above problem, the first clamping arm may be increased in rigidity by increasing the wall thickness thereof. However, this brings about an increase in weight of the brake caliper, resulting in a failure to meet the demand for a reduction in weight of the reaction force type disk brake.

SUMMARY OF THE INVENTION

Accordingly, it is an object of the present invention to provide a reaction force type disk brake of the type described above, which is reduced in weight and in which the opening or inclining of the first clamping arm during braking can be prevented.

To achieve the above object, according to the present invention, there is provided a reaction force type disk brake comprising a brake disk; a first and a second friction pad which are opposed to opposite sides of the brake disk; a brake caliper having of a first and a second clamping arm for clamping the friction pads therebetween, and a pair of bridge portions inter-connecting opposite ends of the respective clamping arms which are spaced from each other in a circumferential direction of the brake disk, the caliper having a window defined by the clamping arms and the bridge portions; an urging member mounted in the first clamping arm for urging the first friction pad against the brake disk; a stationary bracket disposed within the window in the vicinity of the bridge portions and having a pair of support portions on which the friction pads are slidably suspended; and a pair of slide pins provided on the support portions to extend parallel to an axis of rotation of the brake disk and slidably fitted in pin holes made at portions of the first clamping arm connected with the bridge portions, wherein a pair of bag-like raised portions, each of which has the pin hole, are provided on an outer surface of the first clamping arm in a radial direction of the brake disk, one end of each the raised portion being projected from an inner surface of the first clamping arm and connected to a corresponding one of the bridge portions.

With the above construction, it is possible to provide an increased rigidity of the first clamping arm around each pin hole and to reinforce the connected portion of the first clamping arm with each bridge portion by each of the bag-like raised portions. Therefore, even if the weight of the first clamping arm is reduced by reducing the wall thickness thereof, the opening or inclining of the first clamping arm during braking can be prevented.

In addition, it is another object of the present invention to provide a reaction force type disk brake as described above wherein the rigidity of the entire brake caliper is improved.

To achieve the above object, according to the present invention, the brake caliper is constructed into an integral or single-piece form with the clamping arms each connected to the bridge portions in a seamless manner, the first clamping arm including a cylinder with a piston as the urging member slidably received therein, the cylinder being made by machining through a through hole located in the second clamping arm and closed over the entire periphery of the through hole.

With the above construction, the brake caliper is formed into a frame shape of a closed section and therefore, the entire rigidity thereof can be improved. Particularly, the second clamping arm having the through hole can have a higher rigidity as compared with a conventional fork-like second clamping arm.

The above and other objects, features and advantages of the present invention will become apparent from a reading of the following description of the preferred embodiments, taken in conjunction with the accompanying drawings.

DESCRIPTION OF THE PREFERRED EMBODIMENTS

Drawings illustrate a reaction force type disk brake for a vehicle.

Figure 1:
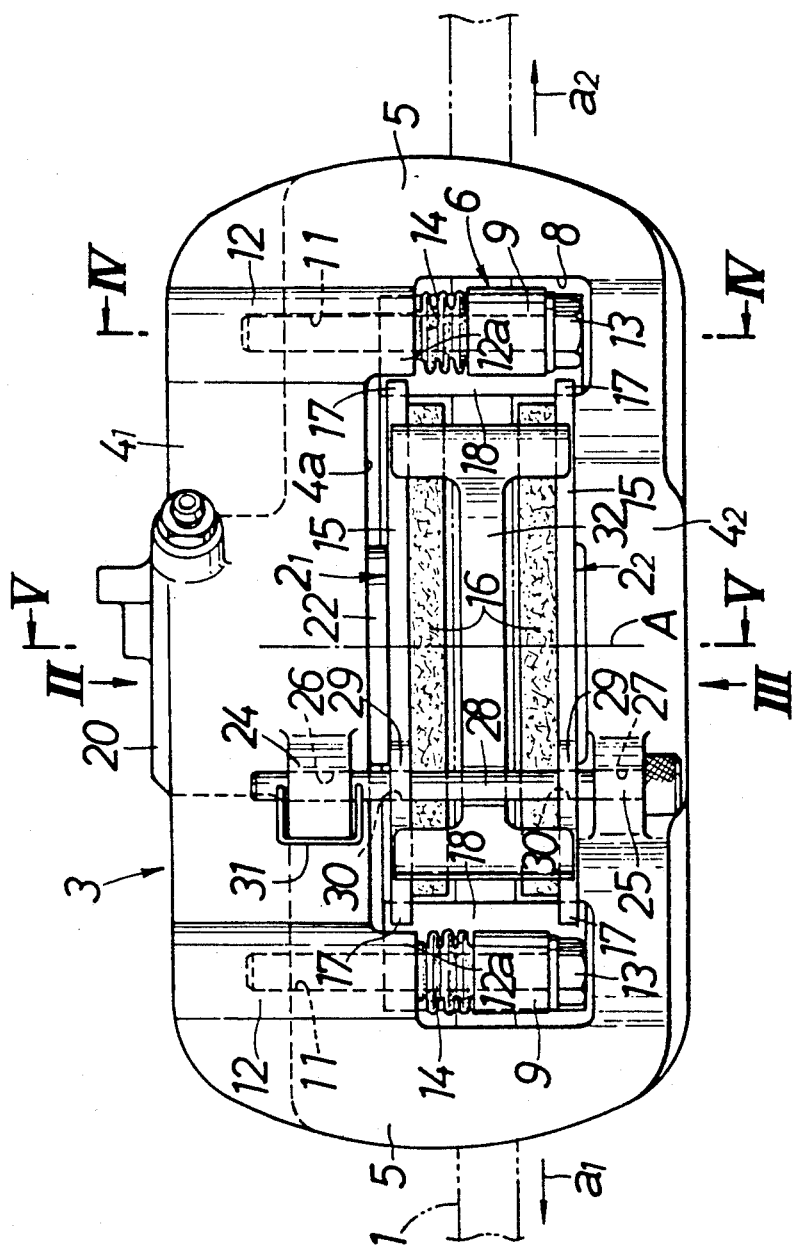
FIG. 1 is a plan view of a reaction force type disk brake.
Figure 2:
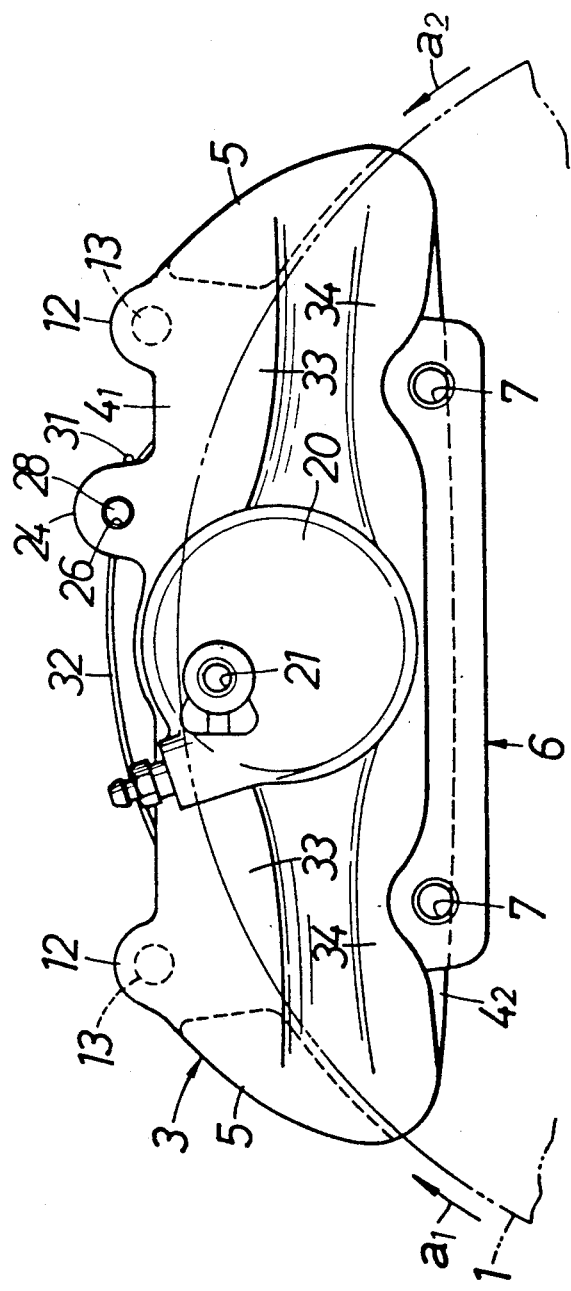
FIG. 2 is a view taken along an arrow II in FIG. 1.
Figure 3:
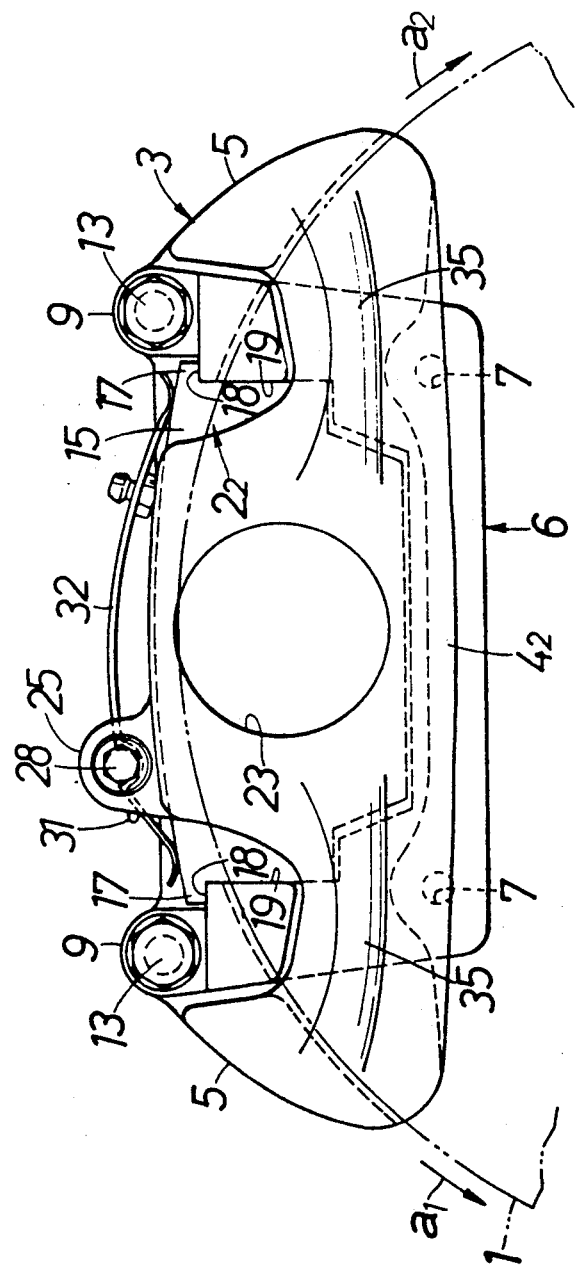
FIG. 3 is a view taken along an arrow III in FIG. 1.

Referring to FIGS. 1 to 3, a brake disk 1 is rotatable with a vehicle wheel about an axis A of rotation in a direction of an arrow $a_1$ during forward movement of a vehicle and in a direction of an arrow $a_2$ during backward movement of the vehicle. A first $2_1$ and a second friction pad $2_2$ are disposed in an opposed relation to opposite sides of the brake disk 1, respectively.

A brake caliper 3 suspending the friction pads $2_1$ and $2_2$ is constructed into an integral rigid frame formed by a first $4_1$ and a second clamping arm $4_2$ for clamping the first and second friction pads $2_1$ and $2_2$ and therebetween by a pair of bridge portions 5 which interconnect circumferentially spaced two ends of respective clamping arms $4_1$ and $4_2$ in a seamless manner.

On the side of the first clamping arm $4_1$, a bracket 6 is disposed on one side of the brake disk 1 and is fixed to a vehicle body. Reference numeral 7 denotes a bolt insertion hole for fixing the bracket 6.

A window 8 is defined by the clamping arms $4_1$ and $4_2$ and the bridge portions 5, and a pair of support portions 9 on the bracket 6 are disposed within the window 8 in the vicinity of the bridge portions 5, respectively. Each of the support portions 9 is bent into a reversed U-shape astride an outer periphery of the brake disk 1, as clearly shown in FIG. 4.

A tapped hole 10 is made in each support portion 9 and has a center line parallel to the axis A about which the brake disk 1 is rotated. A pin hole 11 is provided in a connection of the first clamping arm $4_1$ with each bridge portion so as to lie coaxially with corresponding tapped hole 10. A pair of bag-like raised portions 12, each of which has the pin hole 11 therein, are formed on an outer surface of the first clamping arm $4_1$ so as to be raised in a radial direction of the brake disk 1. Each of the raised portions 12 has one end 12a projecting from an inner surface of the first clamping arm $4_1$ and connected to corresponding one of the bridge portions 5. Each of the bag-like raised portions 12 extends over the entire width of the first clamping arm $4_1$ in the direction of the rotational axis A of the brake disk 1.

A slide pin 13 is threaded at its base end in each of the tapped hole 10, whereby each of the slide pins 13 is located in corresponding one of the support portions 9 so as to extend parallel to the axis A of rotation of the brake disk 1. A tip end portion of each slide pin 13 is slidably fitted in corresponding one of the pin holes 11 in the first clamping arm $4_1$, whereby the brake caliper 3 is mounted on the bracket 6 for sliding movement along the axis A of rotation of the brake disk 1. Each slide pin 13 has a portion exposed to the outside from the pin hole 11 and that portion is covered with an expansible dust-proof boot 14.

Each of the friction pads $2_1$ and $2_2$ is comprised of a backing 15 and a lining 16 bonded to the backing 15, and as clearly shown in FIG. 3, shoulders 17 provided at opposite ends of the backing 15 in a circumferential direction of the brake disk are slidably suspended on stepped portions 18 provided on the support portions 9, respectively.

In the support portions 9, each of mutually opposed surfaces connected to the stepped portions 18 serves as a braking-torque supporting surface 19, and the opposite end faces of the backings 15 in the circumferential direction of the brake disk 1 abut against the braking-torque supporting surfaces 19, respectively.

Figure 5:
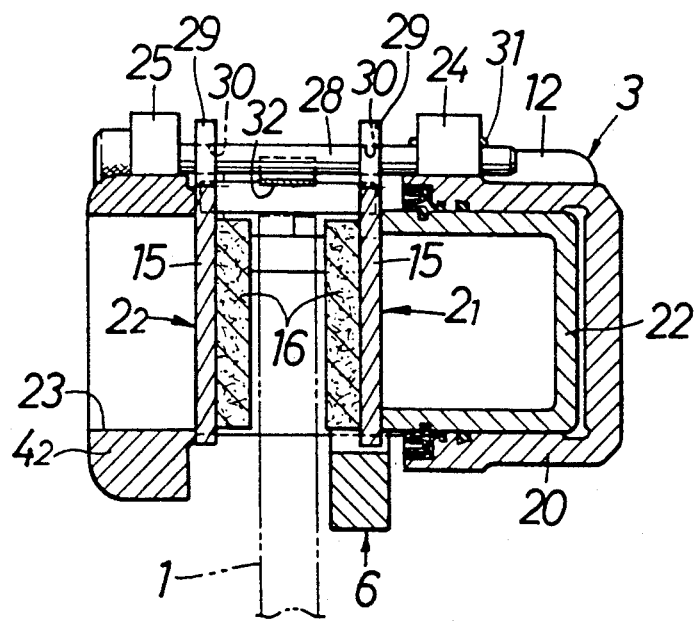
FIG. 5 is a sectional view taken along a line V—V in FIG. 1.

As clearly shown in FIGS. 1 and 5, a cylinder 20 with an opening directed to the first friction pad $2_1$ is provided in the first clamping arm $4_1$ at a central portion between the slide pins 13, and communicates with a known master cylinder through a pressure oil intake hole 21. A piston 22 is slidably received in the cylinder 20 and serves as an urging member for urging the first friction pad $2_1$ against the brake disk 1.

Referring to FIG. 3, a large diameter through hole 23 closed over the entire periphery thereof is made in the second clamping arm $4_2$ and is used when machining the cylinder 20 in the first clamping arm $4_1$. With such a construction, it is possible to improve the rigidity of the second clamping arm $4_2$ as compared with a conventional fork-shaped second arm.

As also clearly shown in FIGS. 1 to 3, projections 24 and 25 are provided on the first and second clamping arms $4_1$ and $4_2$ on one side of a vertical plane including the axis A of rotation of the brake disk 1 and a center line of the cylinder 20, and a hanger pin 28 is withdrawably inserted through and bridged over pin holes 26 and 27 in the projections 24 and 25. A projection 29 protruding radially of the brake disk 1 is provided on the backing 15 of each of the friction pads $2_1$ and $2_2$, and the hanger pin 28 is inserted through a through hole 30 made in the projection 29. This ensures that the friction pads $2_1$ and $2_2$ are suspended on the brake caliper 3 through the hanger pin 28. Reference numeral 31 denotes a hanger pin slip-out preventing member which is disposed to clip the projection 24, with opposite ends of the member 31 being engaged in engage holes in the hanger pin 28.

A pad spring 32 is retained at an intermediate portion thereof to the hanger pin 28, and opposite ends of the pad spring 32 urge the shoulders 17 of the friction pads $2_1$ and $2_2$ against the corresponding stepped portions 18 with a resilient force, thereby preventing a looseness of the friction pads $2_1$ and $2_2$.

Since the friction pads $2_1$ and $2_2$ suspended on the supporting portions 9 are also suspended on the hanger pins 28 as described above, the external locking of the friction pads $2_1$ and $2_2$ from the support portions 9 can reliably be achieved, and the positioning and mounting of the pad spring 32 can easily be conducted by utilizing the hanger pin 28.

Further, since the projections 24 and 25 are disposed at positions out of the above-described vertical plane, the amount of brake caliper 3 projecting radially of the brake disk 1 can be suppressed to provide a reduction in size.

Figure 4:
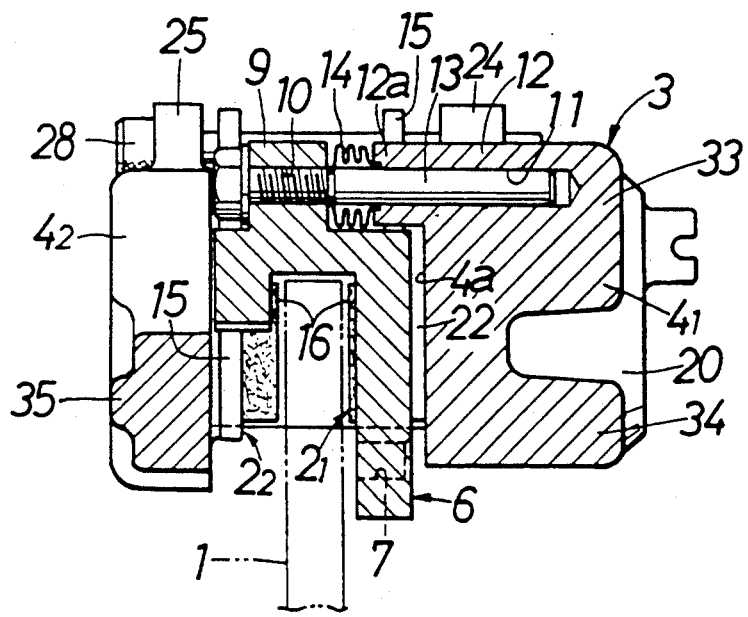
FIG. 4 is a sectional view taken along a line IV—IV in FIG. 1.

As clearly shown in FIGS. 2 and 4, the first clamping arm $4_1$ includes a plurality of, e.g., two (in the illustrated embodiment) reinforcing ribs 33 and 34 provided on each of an upper side and a lower side on an outer surface of the first clamping arm $4_1$ to extend from its central portion and thus from the cylinder 20 toward the bridge portions 5. As clearly shown in FIGS. 3 and 4, the second clamping arm $4_2$ includes a plurality of, e.g., two (in the illustrated embodiment) reinforcing ribs 35 provided on an outer surface of the second clamping arm $4_2$ to extend from its central portion and thus from locations near the through hole 23 toward the bridge portions 5.

These reinforcing ribs 33, 34 and 35 serve not only to reinforce the clamping arms $4_1$ and $4_2$ but also to cool the brake caliper 3 by their cooling fin effect and thus, are useful for suppressing an increase in temperature of a braking oil due to a frictional heat during braking.

The operation of the embodiment will be described below. If a pressure oil is supplied from the master cylinder (not shown) through the pressure oil intake hole 21 into the cylinder 20 operation of a brake pedal or the like when the vehicle is travelling forwardly, the piston 22 is advanced by such pressure oil to urge the first friction pad $2_1$, so that the friction pad $2_1$ is allowed to slide on the stepped portions 18 of the brake caliper 3 and on the hanger pin 28 and is urged against one side of the brake disk 1. The brake caliper 3 is permitted to slide on the slide pins 13 in a direction opposite from the moving direction of the piston 22 by a reaction caused by such urging, so that the second friction pad $2_2$ is urged against the other side of the brake disk 1 by the second clamping arm $4_2$, thereby applying a braking force to the brake disk 1. During this braking, the braking torque of the first and second friction pads $2_1$ and $2_2$ is supported by the backings 15 being carried on the braking-torque supporting surfaces 19 of the bracket 6, whereby transmission of the braking torque to the hanger pin 28 is avoided.

In this case, it is possible to improve the rigidity of the first clamping arm $4_1$ about each pin hole 11 and to reinforce the connected portion between the first clamping arm $4_1$ and each bridge portion 5 by the bag-like raised portion 12, and therefore, even if the weight of the first clamping arm $4_1$ is reduced by reducing the wall thickness thereof, it is possible to prevent the first clamping arm $4_1$ from opening or inclining during braking.

What is claimed is:

1. A reaction force type disk brake comprising a brake disc;

a first and second friction pad which are opposed to opposite sides of the brake disk;

a brake caliper which is comprised of a first and a second clamping arm for clamping the friction pads therebetween, and a pair of bridge portions interconnecting opposite ends of the respective clamping arms which are spaced from each other in a circumferential direction of the brake disk, the brake caliper having a window defined by the arms and the bridge portion;

an urging member mounted in said first clamping arm for urging the first friction pad against said brake disc;

a stationary bracket disposed within said window in the vicinity of the bridge portions and having a pair of support portions on which the friction pads are slidably suspended; and a pair of slide pins fixed at base ends thereof to the support portions of the bracket to extend parallel to an axis of rotation of said brake disc and slidably fitted at tip ends thereof in said pin holes made at portions of said first clamping arm connected with the bridge portions, wherein a pair of bag-like raised portions, each of which has said pin hole therein, are provided on an outer surface of said first clamping arm in a radial direction of the brake disc, an end of each raised portion being projected from an inner surface of said first clamping arm and connected to corresponding one of the bridge portions.

2. A reaction force type disk brake according to claim 1, wherein said bag-like raised portions extend over the entire width of the first clamping arm in a direction of the axis of rotation of said brake disk.

3. A reaction force type disk brake according to claim 1 or 2, wherein each of said first and second clamping arms has a plurality of reinforcing ribs provided on an outer surface thereof and extending from a central portion of each clamping arm toward the bridge portions.

4. A reaction force type disk brake according to claim 1 or 2, wherein said brake caliper is constructed into a single piece with the clamping arms each connected to the bridge portions in a seamless manner, said first clamping arm includes a cylinder with a piston as said urging member slidably received therein, said cylinder being made by machining through a through hole located in said second clamping arm and closed over the entire periphery of the through hole.

5. A reaction force type disk brake according to claim 4, whereby said first clamping arm has a plurality of reinforcing ribs provided on an outer surface thereof and extending from said cylinder toward the bridge portions, and said second clamping arm has a plurality of reinforcing ribs provided on an outer surface thereof and extending from positions near said through hole toward the bridge portions.

6. A reaction force type disk brake according to claim 1, further including a hanger pin bridging over the clamping arms for suspending the friction pads, and a pad spring retained at its intermediate portion to said hanger pin for urging the friction pads against the support portions with a resilient force.

7. A reaction force type disk brake according to claim 1, wherein the base ends of the slide pins fixed to the support portions of the bracket are located within the window near the second clamping arm.

* * * * *